United States Patent [19]

Hüber et al.

[11] 3,917,288
[45] Nov. 4, 1975

[54] PACKING SEAL
[75] Inventors: Wolfgang Hüber, Schweinfurt; Anton Marx, Sulzthal, both of Germany
[73] Assignee: SKF Industrial Trading and Development Company, Amsterdam, Netherlands
[22] Filed: May 31, 1973
[21] Appl. No.: 365,449

[30] Foreign Application Priority Data
June 6, 1972 Germany............................ 2227374

[52] U.S. Cl. ................. 277/59; 277/96 A; 277/56; 277/133
[51] Int. Cl.² ........................................ F16J 15/16
[58] Field of Search ............... 277/96 A, 56, 133, 59

[56] References Cited
UNITED STATES PATENTS
1,991,077   2/1935   Brittain, Jr. ........................ 277/56 X
2,402,033   6/1946   Flinn .................................... 277/96
3,441,284   4/1969   Murray et al. ..................... 277/32 X
3,466,052   9/1969   Ludwig ............................... 277/25
3,477,385   11/1969  Tangeman et al. ............... 277/56 X Primary Examiner—Samuel B. Rothberg

[57] ABSTRACT

A packing seal for closing the space between a rotating shaft and a stationary machine part is described. A ring is located in an annular slot formed in one of the shaft or machine parts. The ring is tensioned radially on the rotating or on the non-rotating part and axially spaced from the frontal faces of the slot so that a fluid media can be located therebetween. At least one face of the ring has a plurality of arcuate grooves by which the pressure of the fluid medium between the ring and the opposing frontal face of the slot is generated on rotation of said shaft.

6 Claims, 4 Drawing Figures 3,917,288

PACKING SEAL

BACKGROUND OF INVENTION

The present invention relates to a sealing gland or sealing rings used to seal the space between a rotating shaft and its surrounding housing.

Packing glands formed from piston rings have been known to be arranged in an annular slot formed in the rotating shaft and to be tensioned radially on the inner surface of the surrounding housing in order to contain the fluid medium located therein which may serve to form the bearing for the relatively rotating parts. Because of this arrangement the gland is caused by the frictional forces generated by the relatively rotating parts to be carried by the rotating member and to frictionally slide over the face of the non-rotating member. A disadvantage of this known friction seal is that the sealing effect diminishes greatly as the pressure of the fluid medium increases and as the peripheral speed of the rotating member also increases. As a result the waste of large amounts of lubricant and/or pressurized media through leakage cannot be prevented. In addition, the known friction seal means creates considerable amount of abrasion, friction and heat resulting in the premature destruction of the seal and the break down of the machine parts themselves.

It is an object of the present invention to provide a sealing system which overcomes the disadvantages of the prior art.

It is a further object of the present invention to provide a sealing gland which may be installed free of friction and abrasion and which may be used at very high pressure and velocity values. The pressure being the pressure of the bearing or lubricant or hydraulic operating medium and the velocity being the peripheral speed of the rotating shaft.

It is a further object of the present invention to provide a sealing gland which generates an increasing pressure in the medium between the gland and the rotating or non-rotating machine members, in order to avoid or to reduce leakage.

Further objects and numerous advantages will be seen in the foregoing disclosure of the present invention.

SUMMARY OF INVENTION

Briefly, the present invention provides a seal ring which is radially tensioned to seat securely on the non-rotating machine part or on the rotating shaft and which has at least on one of its axial faces a plurality of shallow grooves which when the shaft is rotated creates an increase in pressure in the fluid media (air or oil) located between it and the shaft or the non-rotating machine part respectively. Preferably, the grooves are formed as arcuate flutes extending spirally about the face of the seal ring and uniformly with respect to the central axis.

The inventive sealing ring may be formed of an annular member such as the conventional piston ring or from flat lamina disc-like members. Preferably the seals are formed from metal although in cases of low compressive stress materials such as hard synthetic plastic and rubber-like materials may be used. The grooves are formed on one or both of its frontal ends or sides. If formed on both sides the grooves are arranged to be uniform and each side conforms with the other so that the arcs of the grooves face in the same direction with respect to the direction of rotation. The grooves may be formed inexpensively and easily by any known stamping or etching method or other method suitable for the material used.

The seal ring of the present invention may be used in high pressurized systems or in low-pressure seal systems. The ring may be located in a slot formed on the shaft so as to be axially movable with respect to it but tensioned radially to seat on the surrounding housing. A fluid under pressure is delivered to one face of the ring, the opposing face having the grooves formed on it. The rotation of the shaft produces a counter pressure, as a result of the hydrodynamic or aerodynamic effects created by the movement of the fluid within the grooves. This counter pressure stabilizes the rings and prevents loss of fluid from between the members. Simultaneously the counter pressure maintains a pressurized film of fluid between one of the frontal faces of the ring and the slot thus preventing abrasion, friction and heat. Through this invention a seal is provided which is non-abrasive and friction free while being an effective seal even at very high pressure and speed values.

By forming the ring with uniform grooves on both of its sides, which grooves face in the opposite direction when the ring is turned over to the other side, the ring is universally usable, i.e. for both directions of rotation. Concern need be given only to establishing the direction of rotation with respect to the direction in which the grooves are oriented.

Full details of the present invention are given in the following description and will be seen from the accompanying drawings.

DESCRIPTION OF INVENTION

Figure 1:
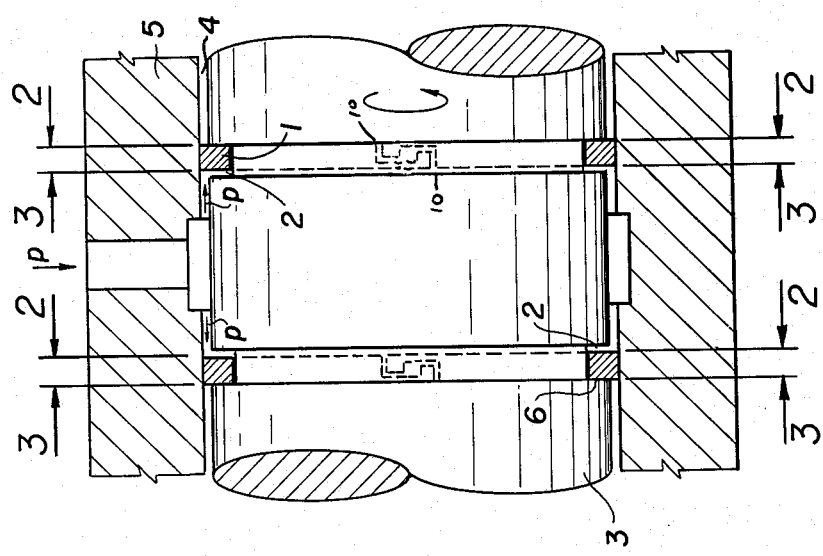
FIG. 1 is a view of a shaft and cylindrical housing (partially in section) showing the seal ring of the present invention as employed in a pressurized system.

The construction and use of the seal of the present invention may be best understood by direct reference to their installation in a specific environment. In FIG. 1 the seal is employed in a pressurized system and comprises an annular member 1 formed in general similar to that of a piston ring having a square or rectangular cross section. A pair of piston rings are located in a pair of spaced annular slots 2 formed on the surface of a rotatable shaft 3. The shaft 3 has an outer diameter slightly less than the inner diameter of a cylindrical bore 4 of a surrounding housing 5. The annular ring members 1 have an outer diameter which is slightly tensioned against the surface of the bore 4 and an inner diameter less than the diameter of the bottom of the slot 2. The annular ring member 1 also has an axial dimension less than that of the slot 2 whereby the annular member has a degree of axial play within the slot 2 and is spaced from the bottom of the slot itself. An inlet port is provided through the wall of the housing 5 for the introduction of a pressurized fluid media (oil and- /or air) against the face of the shaft in the direction shown by the arrow P.

Figure 3:
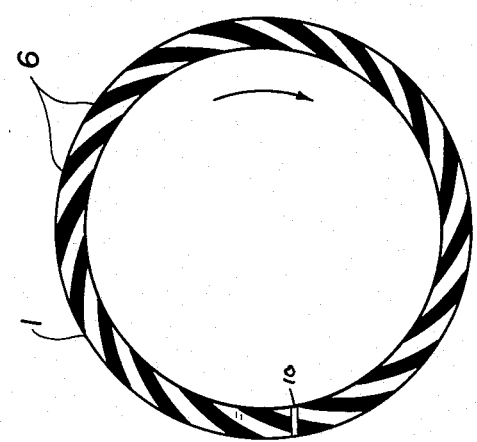
FIG. 3 is a view of the seal taken in the direction of the arrows 3—3 of FIG. 1, and FIG. 4 of a shaft journaled within a housing employing the seal of the present invention as a non-pressurized seal means.
Figure 2:
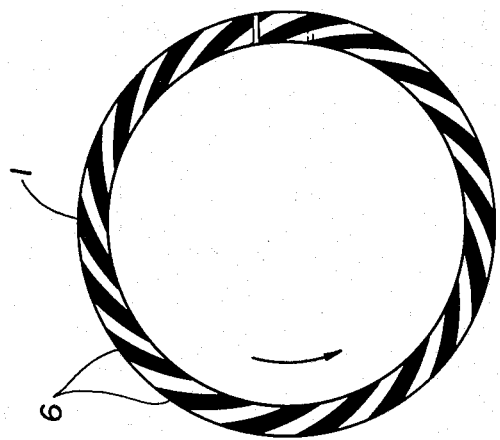
FIG. 2 is a view of the ring taken in the direction of lines 2—2 in FIG. 1.

As seen in detail in FIGS. 2 and 3 both of the axial end faces of the seal ring 1 are formed with shallow grooves 6 which are arcuately shaped in a uniform spiral pattern. The grooves 6 are formed as shallow riflings or flutes extending from the inner circumferential edge to the outer circumferential edge as by stamping, engraving, etching or similar inexpensive and simple processes. Preferably the seal ring 1 is formed from a metal such as steel or the like although other suitable materials may be used. While both sides of the seal ring as employed in the embodiment of FIG. 1 are fluted, it is not necessary that this be so. It is necessary only that the side of the annular ring which is adapted to oppose and cooperate with the surface of the rotating member need be grooved. The other side can be retained smooth. However, where as seen in FIGS. 2 and 3 the grooves are provided on both sides of the seal ring, the grooves are uniformly made and identical in their arcuate direction, with respect to the direction of rotation to be taken by the shaft, indicated by the arrow, so that they appear identical from either side.

Each ring is slotted at 10 so that it may be opened in order to push it over the shaft 3 and to snap it into the groove 2. The slot is forming a labyrinth seal which prevents any flow of fluid media from one face of the ring to the other.

In the embodiment seen in FIG. 1 the seal ring 1 located to the right of the inlet port is pushed with pressurized fluid entering in the direction P from the left. The pressurized fluid media may as desired be either a lubricating oil, a compressive oil or air as well as a suitable mixture of gases. As a result of the pressure of the fluid on the left face of the seal ring 1, the seal ring is forced to the right against the right shoulder of the groove 2 in which it is located. However, as a result of the rotation of the shaft 3, in the direction shown by the arrow, a film of pressurized fluid is built up between the right axial side of the seal 1 and the right shoulder of the annular groove 2. The rotation of the shaft provides a hydrodynamic and/or aerodynamic effect to be created so that a continuous lubricating film of the fluid is created between the frontal face of the seal ring 1 and its corresponding surface in the groove 2. The continuous hydrodynamic or aerodynamic effect superimposes a counter resilient force which acts on the right face of the seal member, that is the opposite face to that on which the pressurized fluid, indicated by the arrow P, acts. In this manner leakage is prevented. Because of the opposing forces, at most only a very small and insignificant amount of the fluid media is lost during operation. In fact, over extended periods of time, very little leakage actually occurs. As a result of the creation of the counter resilient force and of the hydro and aerodynamic effects, a seal member is provided which is free of friction and avoids any abrasive action between the rotating and non-rotating members. In addition, any increase in peripheral speed increases the efficiency of the seal and provides an advantage unexpected in this respect.

The sealing ring on the lefthand side of FIG. 1 is preferably identical to that of the sealing ring installed on the righthand side and is installed with its grooves running in the same direction with respect to the direction of rotation of the shaft as the ring on the right. Consequently, the hydrodynamic effect and the resilient counter effect created by the ring on the lefthand side of FIG. 1 is exactly the same as that created by the ring on the righthand side.

Since the two faces of the seal ring member 1 are identical, the function of the ring itself is not dependent upon the direction at which the pressure medium may be delivered. As seen from FIG. 1 it may be delivered from either the right or the left. During the installation of the seal, only the direction of rotation of the shaft or the other rotating member must be taken into account. And the grooves must be oriented as shown in FIGS. 1 through 3 so that they curve in the direction of rotation. If the shaft 3 were to be rotated counter to the arrow as shown in the Figures then the direction of the grooves 6 in the ring members must be changed accordingly. This is simply done in accordance with the present invention by merely turning the seal ring member over by 180° so that rather than the face shown in FIG. 2 abuts against the left-hand shoulder of the slot in the left part of FIG. 1, the face shown in FIG. 3 is made to abut the right shoulder in the right part of FIG. 1. In other words, the grooves 6 should be placed facing in opposite directions if the shaft is to be rotated oppositely to the direction shown in the drawings, as if FIGS. 2 and 3 were transposed.

It will be seen from the foregoing that through the present invention a sealing ring or gland is fashioned which is capable of handling high loads under high pressure and velocity conditions ($p \times v$ values) since the hydrodynamic or aerodynamic effects guarantees a non-abrasive, friction-free operation wherein the ring is balanced by a resilient counter force against the incoming pressure of the fluid media. In contrast to the known hydrodynamic sealing systems, the present system is significantly more economical having a lower cost of manufacture and requiring less space for installation in the machine parts. The present invention may be employed generally in rotary systems or the like where a pressurized medium, for example oil or air is required. A suitable use in addition to the system described above is in a hydraulically or pneumatically controlled clutch or coupling wherein the sealing element must be simultaneously subjected to high peripheral velocities and high pressures.

Figure 4:
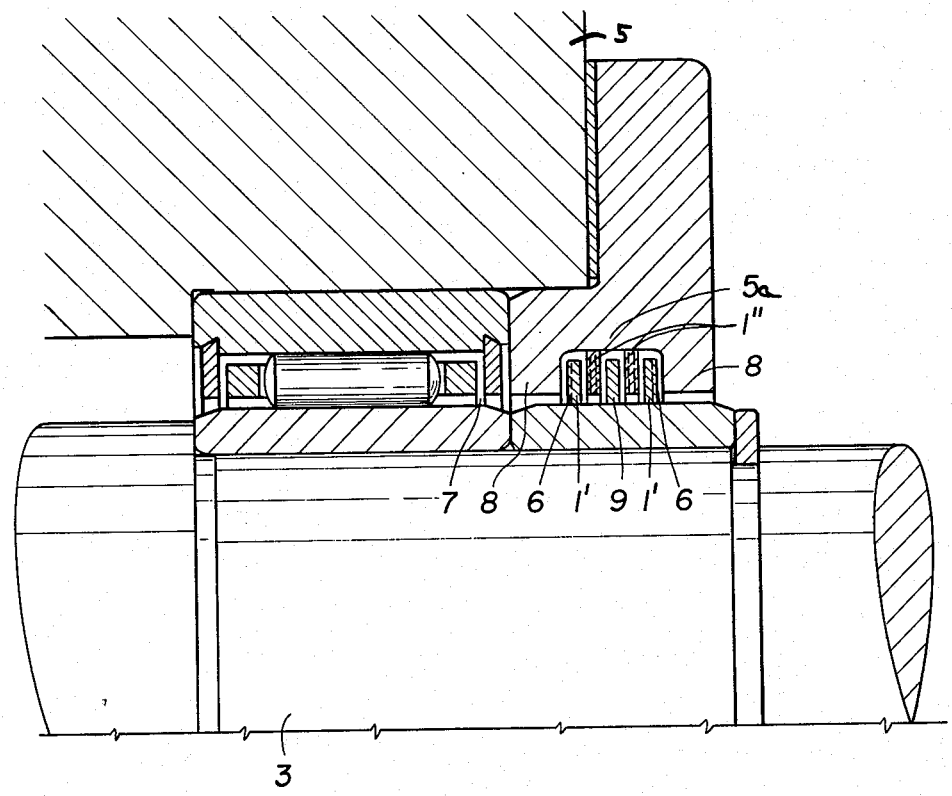

In addition to pressurized systems, the present invention can be employed in non-pressurized bearing systems as seen in FIG. 4. Here the seal ring is employed as a frictionless seal which is intended merely to prevent the loss of lubrication from the bearing or the penetrating of water into the bearing. In this use, a roller bearing 7 is interposed between the shaft 3 and the housing 5 and is held in place by a flanged nut 5a or the like. The sealing system of the present invention is set within a slot 8 formed in the nut 5a and is adapted to prevent the entry of spray water or moisture as well as the exiting of the lubricant from the bearing. Unlike the previous embodiment the seal system of the present embodiment comprises a plurality of spaced flat seal discs or laminae which form a labyrinth seal. Alternate ones of the disc or laminae are prestressed and tensioned so as to fit securely about the shaft 3 while the others of the alternate ones are prestressed radially outward to fit against the bottom of the slot 8. The disc may be keyed or provided with other means to ensure their conjoint rotation with the shaft and their fixed position in the nut 5a. As seen in FIG. 4 a sleeve is interposed between the seal discs and the shaft. However, this is not necessary.

In the system of FIG. 4 the outer rings 1' are stressed on the shaft and have their outer faces, opposing the side walls of the slot 8, provided with the grooves or flutes 6 in the form described in connection with the previous embodiments. Inwardly of these outer discs are a pair of discs 1'' stressed into engagement with the bottom of the slot 8. These seal discs 1'' are provided with the grooves or flutes 6 on both their faces. Located between the upper sealing discs 1'' is a central disc 9 which is prestressed about the shaft 3. This central disc 9 has smooth faces on both its sides. Thus it will be seen that the walls of the slot 8 and the faces of the sealing discs 1', 1'' and 9 are provided with alternate smooth and fluted faces so that a fluted face and a smooth face oppose each other. Preferably the grooves or flutes 6 are in the spiral configuration seen in FIGS. 2 and 3 and are arranged in the same manner so that the oppositely appearing faces have the arc of the grooves extending in the same direction with respect to the direction of rotation of the shaft. That is the outer discs 1', having grooves only on one face are so arranged that if they were put back to back their grooves 6 would appear as discussed earlier. Thus with this arrangement any axial shifting of the shaft 3 places a flat surface contiguous to a fluted surface so that on rotation of the shaft 3 a resultant hydrodynamic or aerodynamic effect is created as well as the resultant counter resilient force which results in the maintenance of a frictionless and non-abrasive seal. As a result of this construction the premature distortion and destruction of the seal and its early replacement are clearly avoided.

While spiral grooves or flutes 6 are shown, other geometric arrangements and curves are possible which would also provide the hydrodynamic or aerodynamic effect. In addition the nature of the slot in which the seal rings or discs may be placed may also be modified without departing from the scope and teachings of the present invention. In general, it is understood that the rotation of the shaft creates a flow of oil or air against the faces of the generally stationary seal rings or discs so that a centripetal flow of the fluid media is created driving the fluid inwardly and thus creating the resilient counter pressure in the system.

Various modifications, changes and embodiments have been suggested by the present disclosure. It is intended that the present disclosure be taken as illustrative only and not limiting of the invention at all.

What is claimed is:

1. A seal for closing the space between a rotating shaft and a stationary machine part comprising an annular ring located in an annular slot formed in a circumferential surface of one of said shaft or machine parts, said ring being tensioned radially on one of the rotating or non-rotating parts and axially spaced from at least one of the frontal faces of said slot for the introduction of a fluid media therebetween, at least the face of said ring opposed to the spaced frontal face of said slot having a plurality of arcuate grooves comprising spiral sections uniformly spaced about the face of said ring parallel to each other and extending curvedly in the same direction with respect to the direction of rotation of said shaft from the inner edge to the outer edge of said ring, said arcuate grooves generating a centripetal flow creating pressure in said fluid medium located between the frontal face of the slot and the opposing face of the ring on rotation of said shaft.

2. The system according to claim 1 wherein the grooves are formed on both sides of said ring, said grooves conforming and both sides being arcuately directed in the same direction with respect to the direction of rotation.

3. The system according to claim 1 wherein said ring is axially movable in said slot and is responsive to an increase in pressure.

4. The system according to claim 3 wherein fluid under pressure is supplied to said seal to normally urge the frontal face of said ring into said contact with the face of said slot, said increase of pressure creating a resilient counter force maintaining said seal in equilibrium.

5. The apparatus according to claim 1 wherein said seal comprises a plurality of rings spaced from each other.

6. The system according to claim 1 wherein said shaft is provided with a pair of slots, each having a ring located therein, and the means for delivering the fluid media is located between said rings, said rings having arcuate grooves formed in the axially outer face thereof conforming to each other and extending in the same direction with respect to the direction of rotation of said shaft.

* * * * *